United States Patent Office 2,906,747
Patented Sept. 29, 1959

2,906,747
PYRAZOLONE-1-CARBOXYLIC ACID AMIDINE MONOAZO DYESTUFFS

Gerhard Wolfrum, Opladen, Germany, assignor to Farbenfabriken Bayer Aktiengesellschaft, Leverkusen, Germany, a corporation of Germany No Drawing. Application September 24, 1957
Serial No. 685,800

Claims priority, application Germany October 13, 1956

6 Claims. (Cl. 260—163)

The present invention relates to new monoazo dyestuffs and to a process for their manufacture; more particularly it relates to monoazo dyestuffs corresponding to the formula

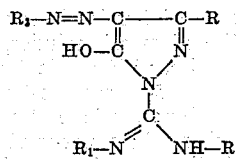

In this formula R means hydrogen, an alkyl-, aryl-, carboxylic acid amide-, carboxylic acid ester- or alkylcarboxylic acid ester group, $R_1$ and $R_2$ stand for hydrogen, an alkyl-, aralkyl- or aryl group whereby the radicals $R_1$ and $R_2$ may be linked with one another to form a ring, $R_3$ means the radical of a diazo component, and the radicals R, $R_1$, $R_2$ and $R_3$ are free of sulfonic acid and carboxylic acid groups but may contain the usual non-ionic substituents such as halogen, nitro- or alkyl groups.

The new monoazo dyestuffs are obtainable by coupling diazo compounds being free of sulfonic acid and carboxylic acid groups with pyrazolone-1-carboxylic acid amidines of the general formula

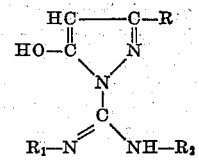

wherein R, $R_1$ and $R_2$ have the same meaning as previously defined.

For the production of the dyestuffs there may be used as diazo components aromatic or heterocyclic amines, which may be substituted, for example, by alkyl-, aryl-, aralkyl-, —CO-alkyl, —CO-aryl, —O-alkyl, —O-aryl groups, halogen, —$SO_2$-alkyl, —$SO_2$-aryl, unsubstituted and substituted sulfonamide groups, —$NO_2$, —CN, —NH—CO-alkyl, —NH—CO-aryl, —CO—NH-alkyl, or —CO—NH-aryl groups, but do not contain any sulfonic acid or carboxylic acid groups. When the radicals R, $R_1$ and $R_2$ represent aryl radicals in the azo component, they can be substituted in the same way.

The pyrazolone-1-carboxylic acid amidines used as azo components may be prepared according to known methods from aminoguanidines, which may be substituted, or their salts and β-ketoacid esters such as oxalacetic acid ester, acetoacetic acid ester, benzoylacetic acid ester, acetone-dicarboxylic acid ester. The production of the 3-methyl-5-pyrazolone-1-carboxylic acid amidine is described in Journal Russ. Phys. Chem. Gesellschaft 44 (1912), page 1312.

The azo dyestuffs obtainable according to the process are suitable inter alia for the dyeing of wool, silk and wool-like materials such as polyamide fibres and polyurethane fibres. They are preferably used for the dyeing of materials such as filaments, ribbons, foils and the like made from polyacrylonitrile.

It is advantageous to use the dyestuffs in the form of their salts with organic or inorganic acids. The dyestuff salts exhibit a good affinity. It is also possible to apply the dyestuffs in the form of free bases to the material preliminarily treated with acids, or to after-treat with acids a material dyed with the dispersed basic dyestuff. The dyeings on polyacrylonitrile are distinguished by their bright shades, good to very good fastness to wet processing and good fastness to light.

The following examples are given for the purpose of illustrating the invention without, however, limiting it thereto; the parts by weight and the parts by volume being in the ratio of grams to millilitres.

Example 1

9.3 parts by weight of aniline are dissolved in 70 parts by weight of water and 60 parts by weight of 4n hydrochloric acid, and diazotized at 0–5° C. with 70 parts by weight of a 10 percent sodium nitrite solution. The resulting diazonium salt solution is run at 5–10° C. into a solution of 14.7 parts by weight of 3-methyl-5-pyrazolone-1-carboxylic acid amidine in 70 parts by volume of water. Coupling is effected first at a pH of 4, then at a pH of 6. The coupling is completed in a short time, and the yellow monoazo dyestuff thus formed can be isolated. It is subsequently dissolved at 60–70° C. in water with dilute hydrochloric acid and salted out as a hydrochloride by the addition of common salt. 30 parts by weight of the hydrochloride of the dyestuff in the form of a yellow, water-soluble powder are obtained.

1 part by weight of the dyestuff is dissolved in 1500 parts by volume of hot water and treated with 1.5 parts by weight of acetic acid and 0.75 part by weight of sodium acetate. 50 parts by weight of polyacrylonitrile fibres are introduced into this solution at 40–50° C. The temperature is raised to boiling point within a half hour and the material is dyed at this temperature for 1–1½ hours. The polyacrylonitrile fibres are subsequently thoroughly rinsed with water and then dried. A bright greenish yellow dyeing is obtained having good to very good fastness to wet processing and very good fastness to light.

The fibres may also be dyed according to the high temperature process as follows:

50 parts by weight of polyacrylonitrile fibres are introduced at about 40° C. into a solution of 1 part by weight of dyestuff in 1500 parts by volume of water treated with 1.5 parts of acetic acid, 0.75 part by weight of sodium acetate, and the dyeing is carried out in a closed apparatus at temperatures between 100 to 120° for 1–1½ hours. After dyeing, the fibres are thoroughly rinsed and dried. A somewhat deeper greenish yellow shade is obtained then at boiling temperature according to the first named dyeing instruction. The shades have good to very good fastness properties.

Example 2

The diazonium salt solution prepared from 12.8 parts by weight of p-chloroaniline, is run at 5–10° C. into a solution of 14.7 parts by weight of 3-methyl-5-pyrazolone-1-carboxylic acid amidine in 70 parts by volume of water. The coupling is effected first at a pH of 5, then at a pH of 6, and is completed after a short time. The dyestuff is isolated and subsequently converted at 60–70° C. by dissolution in water with dilute hydrochloric acid into the hydrochloride which is isolated by salting out with common salt. 32 parts by weight of a yellow, readily water-soluble powder are obtained.

When following the dyeing instruction given in Example 1, this dyestuff yields on polyacrylonitrile fibres a bright greenish yellow shade having good to very good fastness to wet processing and very good fastness to light.

If instead of p-chloroaniline, o-chloroaniline is used as diazo component for the production of the dyestuff in this example, and the resulting dyestuff is dyed onto polyacrylonitrile, fibres, a strongly greenish yellow shade is obtained having similar fastness properties.

Similar dyestuffs or shades are obtained by using as diazo components 1-amino-3-chlorobenzene, 1-amino-2,4-dichlorobenzene, 1-amino-2- or -3- or -4-bromobenzene or similar halogen-substituted aminobenzenes.

Example 3

5.9 parts by weight of 1-methyl-5-aminobenztriazole are diazotized according to conventional methods and coupled, as described in Example 1, with 4.1 parts by weight of 3-methyl-5-pyrazolone-1-carboxylic acid amidine. The dyestuff base thus formed is dissolved at 50–70° C. in water with acetic acid and by salting out, 12 parts by weight of the acetate of the dyestuff are obtained as a water-soluble yellowish brown powder. The dyestuff dyes according to the dyeing instruction of Example 1, polyacrylonitrile fibres in yellow shades of good fastness properties.

Similar dyestuffs or dyeings are obtained with the use of 5-amino-2-methyl-benzthiazole as diazo component.

Example 4

20 parts by weight of 1-amino-6-methoxy-3-methylbenzene are diazotized according to conventional methods, the diazonium salt solution is added at 5–10° C. to a solution or suspension of 21 parts by weight of 3-methyl-5-pyrazolone-1-carboxylic acid amidine, the mixture is coupled as described in Example 1, and the resulting dyestuff base is converted into the hydrochloride. 50 parts by weight of a yellow, water-soluble powder are obtained which dyes polyacrylonitrile fibres by the dyeing method indicated in Example 1 in very strong yellowish orange shades with very good fastness to wet processing and good fastness to light.

If 4-chloro-2-anisidine is used as diazo component for the production of the dyestuff in this example, a dyestuff is obtained which dyes polyacrlyonitrile in intense reddish yellow shades with the same good fastness properties. With aminohydroquinone-dimethyl ether as diazo component, a dyestuff is obtained which dyes polyacrylonitrile fibres in orange shades of very good fastness to wetting and good fastness to light.

Similar dyestuff or shades are obtained if instead of the aforesaid diazo components the following compounds are used as diazo component: 4-amino-1,3-dimethoxybenzene, 4-amino-6-chloro-1,3-dimethoxybenzene, 2-amino-4-nitroanisole, 4-amino-3-nitrophenetole, or 2-amino-diphenyl ether.

Example 5

9.2 parts by weight of diazotized 2-amino-5-benzoylamino-1,4-diethoxybenzene are coupled with 4.1 parts by weight of 3-methyl-5-pyrazolone-1-carboxylic acid amidine and the resulting dyestuff base is converted into the acetate according to Example 3. 15 parts by weight of a reddish brown, water-soluble powder are obtained which dyes polyacrylonitrile fibres according to the dyeing instruction given in Example 1 in strong bluish red shades.

5-amino-4-chloro-2-benzoylamino-anisole, 2-amino-5-acetyl-amino-1,4-dimethoxybenzene, N-(4-aminophenyl)-pyrrolidone or 5-aminobenzoxazolone may also be used as diazo components in this example.

Example 6

23.3 parts by weight of 2-amino-diphenylsulfone are diazotized according to known methods. The diazonium salt solution is run at 5–10° C. into a solution of 14.7 parts by weight of 3-methyl-5-pyrazolone -1-carboxylic acid amidine. The coupling is effected at a pH of 6 to 7 and the dyestuff is isolated by filtration. The hydrochloride (40 parts by weight) prepared according to Example 1, is a yellow, water-soluble powder which, according to the dyeing method described in Example 1, dyes polyacrylonitrile fibres in greenish yellow shades of very good fastness to wet processing and good fastness to light.

The following amines may also be used as diazo component instead of 2-amino-diphenylsulfone: 1-methoxy-2-aminophenyl-4-ethylsulfone, 1-chloro-2-amino-phenyl-4-ethylsulfone, 4-methoxy-3-amino-diphenylsulfone, 1-aminobenzene-4-sulfodimethylamide, 2-toluidine-4-sulfodimethylamide or 1-methoxy-2-aminobenzene-4-sulfodiethylamide. The dyestuffs prepared with the aforesaid amines as diazo components may be dyed on to polyacrylonitrile fibres according to the dyeing instruction given in Example 1 and yield shades of good to very good fastness to wet processing and good fastness to light.

Example 7

19.7 parts by weight of 4-amino-benzophenone are diazotized and the diazonium salt solution is coupled according to the instruction of Example 1 with 14.7 parts by weight of 3-methyl-5-pyrazolone-1-carboxylic acid amidine. After converting the base into the hydrochloride, 40 parts by weight of a water-soluble yellow powder are obtained yielding on polyacrylonitrile fibres yellow shades according to the dyeing instruction indicated in Example 1, which are very fast to light and wet processing.

Example 8

15.3 parts by weight of aminohydroquinone-dimethyl ether are diazotized according to known methods and coupled according to the instruction given in Example 1 with 27.8 parts by weight of 3-phenyl-5-pyrazolone-1-carboxylic acid amidine-nitrate. The dyestuff is converted into the hydrochloride. 45 parts by weight of a red powder, readily soluble in hot water, are obtained which dyes polyacrylonitrile fibres according to the dyeing instruction of Example 1 in strong reddish orange shades. The shades are distinguished by good to very good fastness to wetting and good fastness to light.

If 3-phenyl-5-pyrazolone-1-carboxylic acid amidine is used for the production of the dyestuff in Examples 1–7, valuable dyestuffs are also obtained which dye polyacrylonitrile fibres in very fast shades.

Example 9

A diazonium salt solution prepared from 9 parts by weight of 1,3-dimethoxy-4-aminobenzene is added with stirring at 5–10° C. to a suspension of 18 parts by weight of 3-(m-nitrophenyl)-pyrazolone - (5) - carbamidine-(1) nitrate in 100 parts of volume of water. The coupling is effected at a pH of 5, the dyestuff isolated by filtration and converted into the hydrochloride according to the instruction given in Example 1. 30 parts by weight of a reddish brown powder is obtained which is soluble in hot water and dyes polyacrylonitrile fibres according to the dyeing instruction of Example 1 in brick-red shades. The shades have a very good fastness to wet processing and good fastness to light.

Example 10

10.2 parts by weight of N-(4-aminophenyl)-pyrrolidone are diazotized according to known methods and the resulting diazonium salt solution is added to a solution of 17 parts by weight of pyrazolone-(5)-acetic acid ethyl ester-(3)-carbamidine-(1)-nitrate in 70 parts by volume of water. The mixture is stirred for a short time at a pH of 6 and the dyestuff formed is subsequently filtered off. After dissolution in hot water with a little dilute acetic acid and subsequent salting out, 30 parts by weight of the acetate of the dyestuff are obtained in the form of a brown-orange colored powder. According to the dyeing instruction given in Example 1, polyacrylonitrile fibres are dyed with this dyestuff in strong reddish yellow shades, which show very good fastness to wet processing and good fastness to light.

*Example 11*

19.7 parts by weight of 4-aminobenzophenone are diazotized according to known methods and the diazonium salt solution is added to a solution of 16.2 parts by weight of 3-methyl-pyrazolone-(5)-N-methylcarbamidine-(1) in 70 parts by volume of water. The coupling yielding the monoazo dyestuff is completed in a short time at a pH of 5–6. The dyestuff thus obtained is isolated according to conventional methods and converted into the water-soluble yellow hydrochloride by the method indicated in Example 1. The dyestuff dyes polyacrylonitrile fibres according to the dyeing method described in Example 1, in fast yellow shades.

*Example 12*

A diazonium salt solution prepared from 3.4 parts by weight of 1-amino-2-methoxy-5-chlorobenzene according to conventional methods is added to a solution of 12.3 parts by weight of 1[Δ$^{1',2'}$-imidazolinyl-(2')]-3-methyl-pyrazolone-(5)-hydrochloride of the formula

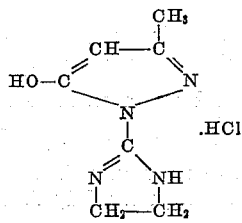

in 70 parts by volume of water. The mixture is stirred for some time at a pH of 5–6 at 10–15° C. and the dyestuff thus formed is isolated in conventional manner. The dyestuff is converted into the hydrochloride according to the method given in Example 1. 25 parts by weight of an orange-colored powder are obtained which dyes polyacrylonitrile fibers according to the dyeing instruction of Example 1, in intense reddish yellow shades which have very good fastness to wet processing and to light.

*Example 13*

10.7 parts by weight of 1-amino-3-methylbenzene are diazotized according to known methods. The diazonium salt solution is run at 5–10° C. into a solution or suspension of 14.3 parts by weight of 3-methyl-5-pyrazolone-1-carboxylic acid amidine in 70 parts by volume of water. The pH value of the solution is adjusted to about 6. The coupling is completed in a short time and the resulting yellow monoazo dyestuff can be filtered off by suction. It is subsequently converted into its hydrochloride at 60–80° C. by dissolution in a little water with dilute hydrochloric acid and isolated from the solution by the addition of excess hydrochloric acid or by salting out. 30 parts by weight of a readily water-soluble yellow powder are thus obtained. The dyestuff dyes polyacrylonitrile fibres according to the dyeing insrtuctions given in Example 1, in greenish yellow shades fast to wet processing and to light.

Dyestuffs having similar dyeing properties are obtained if instead of 1-amino-3-methylbenzene, there is used as diazo component 1-amino-2-methylbenzene, 1-amino-4-methylbenzene, 1-amino-3,4-dimethylbenzene, 1-amino-2,5-dimethylbenzene, 1-amino-2-, 3- or 4-ethylbenzene or similar alkyl-substituted aminobenzenes.

*Example 14*

12.4 parts by weight of 1-amino-3-methoxybenzene are dissolved in 100 parts by volume of water and 25 parts by weight of concentrated hydrochloric acid and this solution is diazotized at 0–5° C. with a solution of 6.9 parts by weight of sodium nitrite in 62 parts by volume of water. The diazonium salt solution is run at 0–10° C. into a suspension or solution of 14.3 parts by weight of 3-methyl-5-pyrazolone-1-carboxylic acid amidine in 100 parts by volume of water maintaining a pH value of about 5–7 by simultaneously adding sodium hydroxide or sodium carbonate. After stirring for 1–2 hours the coupling is completed. 40 parts by weight of common salt are added and the product is then filtered off by suction. By dissolution in about 200–300 parts by volume of water at 70–90° C. with a little dilute hydrochloric acid, the hydrochloride is obtained which may be isolated by the addition of larger quantities of concentrated hydrochloric acid or by salting out. 31 parts of the readily water-soluble dyestuff hydrochloride are thus obtained which yields on polyacrylonitrile fibres, according to the dyeing instructions of Example 1, very fast greenish yellow shades.

If instead of 1-amino-3-methoxybenzene there is used as diazo component 1-amino-2-methoxybenzene, a dyestuff is obtained which yields on polyacrylonitrile fibres reddish yellow shades of very good fastness to wet processing and to light. If 1-amino-4-methoxybenzene is used as diazo component, a dyestuff is obtained which dyes polyacrylonitrile fibres in intense reddish yellow shades which also have very good fastness properties.

Instead of the methoxy-aminobenzenes, the corresponding ethoxy-aminobenzenes or other O-alkyl ethers of aminophenoles may also be used as diazo components. In all these cases dyestuffs are obtained having good to very good fastness properties.

*Example 15*

4 parts by weight of 1-amino-2-nitrobenzene are diazotized according to conventional methods, and the diazonium salt solution is added at 5–10° C. to a suspension of 4.2 parts by weight of 3-methyl-5-pyrazolone-1-carboxylic acid amidine in 50 parts by volume of water. The coupling is completed at a pH value of 5–7 after a short time and the dyestuff can be filtered off. It is converted into its hydrochloride according to the process described in Example 1. 9 parts by weight of the dyestuff hydrochloride are thus obtained. The dyestuff yields on polyacrylonitrile fibres according to the dyeing methods indicated in Example 1 an intense greenish yellow shade having very good fastness to wet processing and good fastness to light.

*Example 16*

15.3 parts by weight of 1-amino-2,5-dimethoxybenzene are diazotized according to known methods and the diazonium salt solution is added to a solution of 15.9 parts by weight of 3-methyl-5-pyrazolone-1-N-methyl-carboxylic acid amidine in 70 parts by volume of water. The coupling is completed at a pH of 5–7 after a short time and the dyestuff can be filtered off. It is converted into its hydrochloride by the method indicated in Example 1 yielding 42 parts by weight. It dyes polyacrylonitrile fibers according to the dyeing process of Example 1 in orange-brown shades having good fastness properties.

*Example 17*

13.7 parts by weight of 1-amino-3-methyl-6-methoxybenzene are diazotized by known methods and the diazonium salt solution is added to a solution of 20.8 parts by weight of 1-[1',2'-imidazolinyl-(2')]-methylpyrazolone-(5)-hydrochloride in 70 parts by volume of water. The coupling is completed at a pH 5–7 after a short time and the resulting dyestuff is isolated by filtration. It is converted into its hydrochloride according to the method described in Example 1 and dyes polyacrylonitrile fibres according to the dyeing process given in Example 1 in strong reddish yellow shades which have good to very good fastness properties.

I claim:
1. Monoazo dyestuffs corresponding to the formula

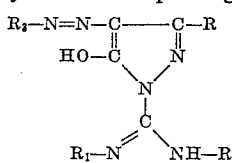

wherein R stands for a member selected from the group consisting of hydrogen, a lower alkyl, phenyl and lower alkylcarboxylic acid ester group, $R_1$ and $R_2$ mean radicals selected from the group consisting of hydrogen, a lower alkyl group and lower alkylene groups linked with one another, $R_3$ stands for a radical of a diazo component, and the radicals R, $R_1$, $R_2$ and $R_3$ are free of sulfonic acid and carboxylic acid groups.

2. The monazo dyestuff corresponding to the formula

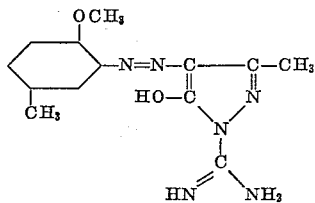

3. The monazo dyestuff corresponding to the formula

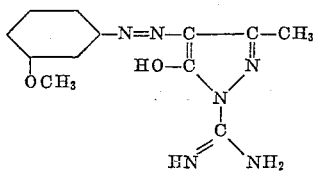

4. The monoazo dyestuff corresponding to the formula

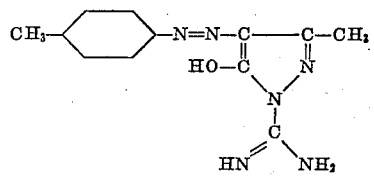

5. The monazo dyestuff corresponding to the formula

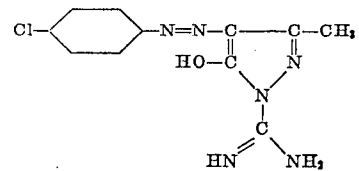

6. The monoazo dyestuff corresponding to the formula

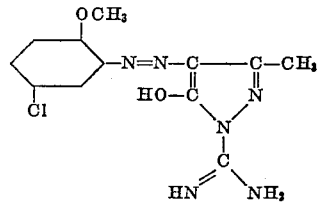

References Cited in the file of this patent

UNITED STATES PATENTS 2,634,262  Piepenbrink et al.  Apr. 7, 1953

OTHER REFERENCES

Shestakov et al.: Chem. Abs., vol. 7, page 984 (1913).
American Dyestuff Reporter, July 5, 1954, page 428.